United States Patent
Livingston et al.

[15] 3,672,391
[45] June 27, 1972

[54] AUTOMATIC CHEMICAL FEEDER APPARATUS

[72] Inventors: Richard W. Livingston, 10100 Raytown Road, Kansas City, Mo. 64134; George L. Michaels, 8505 Booth Street, Kansas City, Mo. 64138

[22] Filed: Jan. 2, 1970

[21] Appl. No.: 239

[52] U.S. Cl.................137/240, 134/95, 134/100, 134/171, 137/624.15
[51] Int. Cl..........................B08b 9/06, F16k 19/00
[58] Field of Search.............134/22 R, 22 C, 166 C, 95, 134/171; 137/1, 15, 238, 240, 247.41, 247.49, 247.51, 268, 604, 624.13, 624.15; 4/101, 220, 222, 225

[56] References Cited

UNITED STATES PATENTS

| | | |
|---|---|---|
| 2,604,895 | 7/1952 | Fechter........................134/22 X |
| 2,786,210 | 3/1957 | Fraser.............................4/101 |
| 3,267,964 | 8/1966 | Steinmetz..................137/624.13 |

FOREIGN PATENTS OR APPLICATIONS

| | | |
|---|---|---|
| 211,271 | 2/1924 | Great Britain.....................4/226 |

*Primary Examiner*—M. Cary Nelson
*Assistant Examiner*—Richard Gerard
*Attorney*—Phillip A. Rein

[57] ABSTRACT

This invention is a chemical feeder apparatus operable to automatically discharge a chemical mixture into a plurality of sewer trap assemblies in order to remove any impurity such as grease build up. More particularly, this invention is a chemical feeder apparatus operable to receive an inlet fluid and mix the same thoroughly with a chemical solution through a concentrate valve structure for discharge therefrom through a plurality of outlet control valves for cleansing purposes and including a timing mechanism for pre-selected periodic actuation thereof.

3 Claims, 3 Drawing Figures

PATENTED JUN 27 1972

INVENTORS
RICHARD W. LIVINGSTONE
GEORGE L. MICHAELS
BY
Phillip A. Bein
ATTORNEY

AUTOMATIC CHEMICAL FEEDER APPARATUS

Numerous prior art structures are available such as grease separator assemblies and chemical compounds for killing roots and removing grease from piping systems. However, none of the prior art devices are permanently installed in a piping system and automatically operable to cleanse the interconnected pipe members and sewer traps. In fact, there is a great need in the art to have a means of dispensing automatically a chemical product in the sewer pipes and traps that have a grease or other undesirable build up thereon to flush and clean the same daily at predetermined intervals. It is to be noted that the grease and other such substances, when hot, going into a sewer pipe or trap, will build up on the inner surface of the pipe and at night when the pipes are not in use, the grease cools and hardens. After the grease is hardened, it is very difficult to remove and, additionally, the continued build up of the grease causes a restriction and an increased resistance to fluid flow through the piping system. Normally, such build up has to be eliminated by a hand operation with proper tooling perhaps chemical treatment.

In one preferred embodiment of this invention, an automatic chemical feeder apparatus is provided including a first fluid supply assembly connected to a control means to supply fluid thereto; a concentrate supply drum connected through a hose member to the control means; and a plurality of individual sewer trap assemblies interconnected by tube members to the control means to periodically receive a chemical mixture therefrom for removing grease build up or the like in the individual sewer trap assemblies. The fluid supply assembly includes a first inlet pipe member which successively conveys fluid such as water through a check valve member; a gate valve; and a pressure regulator valve in order to supply the fluid into the control means at the desired volume and pressure. The control means includes a main wall mount control cabinet having a fluid inlet assembly therein to receive fluid from the fluid supply assembly; a concentrate inlet assembly to receive a chemical from the concentrate supply drum; a mixture discharge assembly in order to selectively supply the chemical mixture to the hose members into the individual sewer trap assemblies; and an actuator assembly operable in a pre-selected manner to cause periodic operation of the chemical feeder apparatus. The fluid inlet assembly includes a first pipe member interconnected to receive fluid from the fluid supply assembly and directs same through an electric solenoid valve member which is connected to the actuator assembly. From the solenoid valve member an outlet portion is connected to the concentrate inlet assembly which includes a venturi member having an intermediate portion interconnected through an adjustable valve member to the hose member into the concentrate supply drum. The mixture discharge assembly includes an intermediate pipe member connected to the output side of the venturi member and successively through a plurality of T-members and individual pressure control valves which, in turn, are connected to the hose members to the respective individual sewer trap assemblies for controlled fluid discharge thereto. It is noted that the hose members are interconnected to an upper portion of the sewer trap assemblies so as to discharge the chemical mixture therein and cause a flushing and chemical action against the interior surfaces of the sewer trap assemblies. The actuator assembly includes an electrical conductor which is connected through an on/off switch member to a 24-hour time clock mechanism and a time delay relay which, in turn, is connected to the electrical solenoid valve member for selective actuation thereof. The chemical feeder apparatus of this invention operates through the use of the various valve members to provide for a predetermined controlled pressure flow throughout the system to achieve a uniform mixture of inlet fluid and chemical concentrate which is discharged through a plurality of adjustable pressure control valves to assure that the same amount of chemical is discharged into respective ones of the sewer trap assemblies irregardless of the distance of the individual sewer trap assemblies from the control means.

One object of this invention is to provide a chemical feeder apparatus to overcome the aforementioned disadvantages of the prior art structures.

Still, one further object of this invention is to provide a chemical feeder apparatus connected through a control means to an inlet supply fluid which is mixed at predetermined intervals with a concentrate mixture for periodic discharge through a mixture discharge assembly to individual ones of sewer trap assemblies for removing grease and other such materials.

Still, one other object of this invention is to provide a chemical feeder apparatus which is automatically operable through the use of an actuator timing assembly in order to receive an inlet fluid at a predetermined pressure and volume for mixing with a concentrate for discharge into a plurality of individual sewer trap assemblies and having the discharge so regulated to have an equal amount of chemical mixture flow into each of the sewer trap assemblies.

Still, one further object of this invention is to provide a chemical feeder apparatus which is easy to install, economical to manufacture, operable automatically for cleansing of piping systems during night time non-usage periods, substantially maintenance free, and readily adjustable to assure the accurate controlled amount of fluid discharge and mixture ratio.

Various other objects, advantages, and features of the invention will become apparent to those skilled in the art from the following discussion, taken in conjunction with the accompanying drawings, in which.

Figure 1:
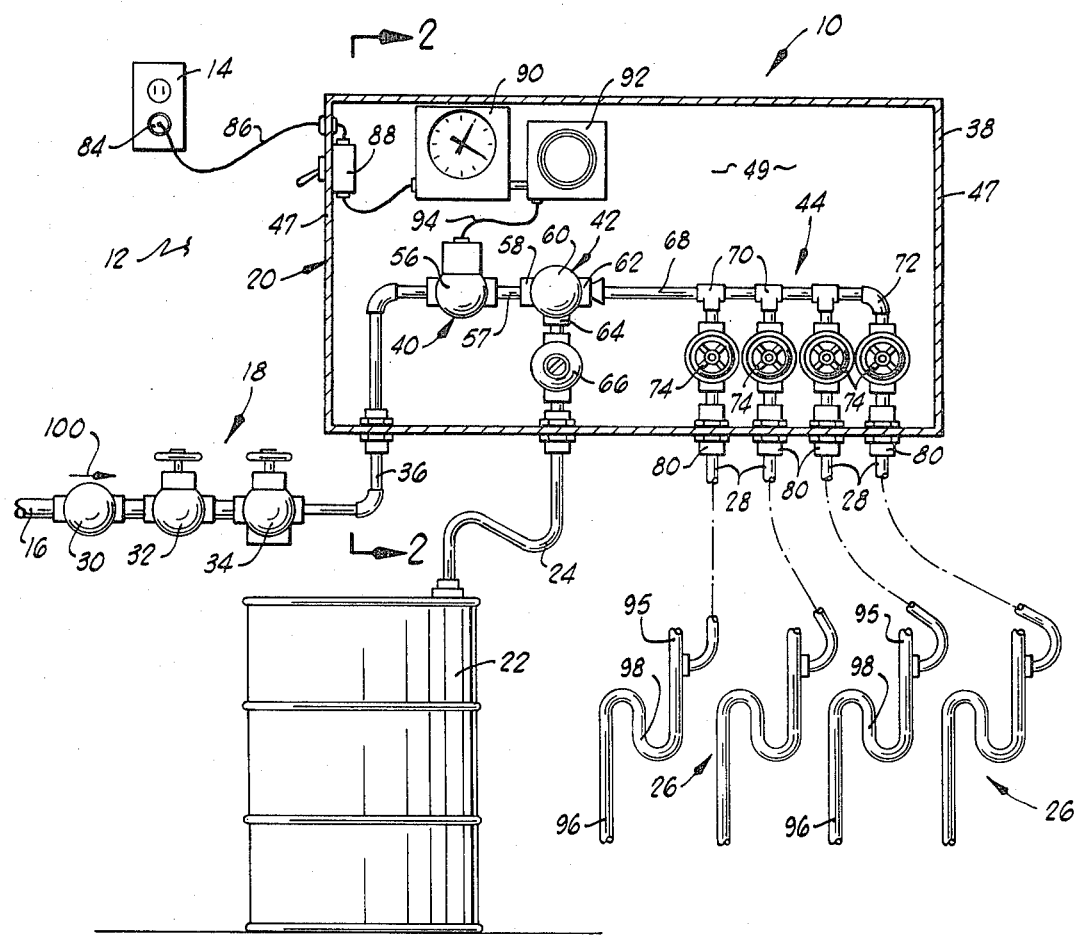
FIG. 1 is an elevational view of the chemical feeder apparatus of this invention having a front wall of a wall mount control cabinet removed for clarity.

The following is a discussion and description of preferred specific embodiments of the new chemical feeder apparatus of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular FIG. 1, a chemical feeder apparatus of this invention, indicated generally at 10, is shown as mounted upon a wall surface 12 and requiring an electrical supply from a plug-in receptacle 14 and a fluid supply such as water from a first supply pipe member 16. The chemical feeder apparatus 10 includes a fluid supply assembly 18 to receive and regulate fluid from the supply pipe member 16; a control means 20 connected to the fluid supply assembly 18; a concentrate supply drum 22 interconnected as by a hose member 24 to the control means 20; and a plurality of individual sewer trap assemblies 26 each interconnected by respective tube members 28 to the control means 20.

The fluid supply assembly 18 includes, in successive order, a check valve member 30 to first receive fluid from the supply pipe member 16 to permit flow in only the direction towards the control means 20; a gate valve member 32 to regulate the volume of fluid flow; and a pressure regulator valve 34 to control the pressure of the fluid to be supplied therefrom through an outlet pipe member 36 into the control means 20.

The control means 20 includes a wall mount control cabinet 38 having therein a fluid inlet assembly 40; a concentrate inlet assembly 42; a mixture discharge assembly 44 interconnected to the respective hose members 24 for conveyance of a fluid mixture therefrom; and an actuator assembly 46 operably connected to the fluid inlet assembly 40.

Figure 2:
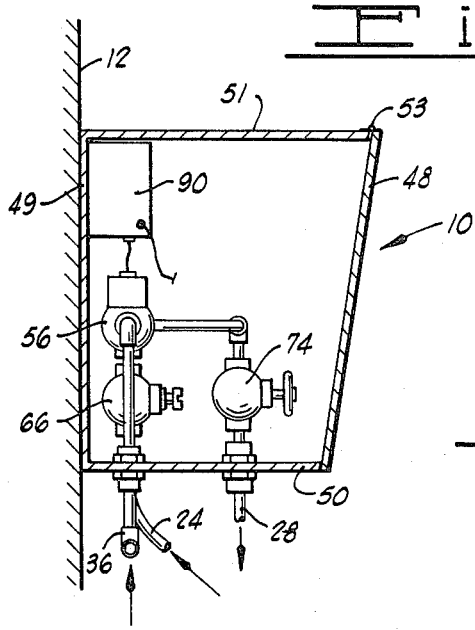
FIG. 2 is a sectional view taken along line 2—2 in FIG. 1.

The wall mount control cabinet 38 is provided with opposed side walls 47; front and back walls 48 and 49; and bottom and top walls 50 and 51, respectively, so as to provide a compact enclosed structure which can be readily mounted on the wall surface 12 as shown in FIG. 2. Also, the front wall 48 may be pivotally connected along its upper edges by a hinge member 53 so as to be moved counterclockwise, as viewed in FIG. 2, for any adjustment or repair required of the control means 20 contained therein. Of course, a lock member could be placed upon the front wall 48 in order to secure the same and prevent unauthorized entry.

The fluid inlet assembly 40 receives fluid from the outlet pipe member 36 and conveys the same into an electrical solenoid valve member 56 which is of the normally closed type. The output from the solenoid valve member 56 moves through a fluid conductor 57 into an inlet side 58 of a venturi member 60 which is part of the concentrate inlet assembly 42 for subsequent discharge on an outlet side 62 thereof. An intermediate portion 64 of the venturi member 60 is connected to an adjustment valve 66 to regulate the amount of concentrate flow from the hose member 24 connected to the concentrate supply drum 22.

The outlet side 62 of the venturi member 60 is connected to an intermediate pipe member 68 which conveys the new fluid mixture to a plurality of T-members 70 and an elbow member 72 which individually directs the mixture downwardly through respective ones of pressure control valves 74. The discharge tube members 28 connected to the sewer trap assemblies 26 are mounted within connector members 80 in the bottom wall 50 of the control cabinet 38 and to respective ones of the pressure control valves 74 so as to receive the fluid mixture.

The actuator assembly 46 includes a first electrical conductor plug 84 mounted within the plug-in receptacle 14 and having conductor wires 86 through an on/of switch member 88 and then into a time clock mechanism 90 which, in turn, selectively supplies current through a time delay relay tube 92 by a conductor 94 to the electrical solenoid valve 56. The time clock mechanism 90 is of a 24 type and can be readily set with a plurality of pull-out pins (not shown) so as to accurately determine the hour of actuation to open the solenoid valve member 56 to cause operation of the chemical feeder apparatus 10 as will be explained. The time delay relay tube 92 is operable to open the circuit between the time clock mechanism 92 and the electrical solenoid valve member 56 after a predetermined period of actuation such as 5, 10, or 15 seconds depending upon which type of tube is selected and the amount of fluid mixture desirable to discharge into the individual sewer trap assemblies 26. The concentrate supply drum 22 is of a substantially conventional nature containing a solvent solution which would dissolve grease and such undesirable build up material found in the interior of the sewer trap assemblies 26. The hose member 24, of course, has its lower end, which is not shown, adjacent the bottom of the concentrate drum 22 as the fluid is pulled therefrom by a pressure differential.

It is seen that the individual sewer trap assemblies 26 are each provided with an inlet section 95 and a discharge section 96 and an S-shaped pipe section 98 therebetween which is designed to prevent large foreign material from reaching further portions of the piping system. It is noted that the tube members 28 of the mixture discharge assembly 44 are connected at a portion above the S-shaped pipe section 98 and actually may be supplied directly below the entrance thereto to assure complete cleansing of the interior surface of the respective piping system during its operation.

Figure 3:
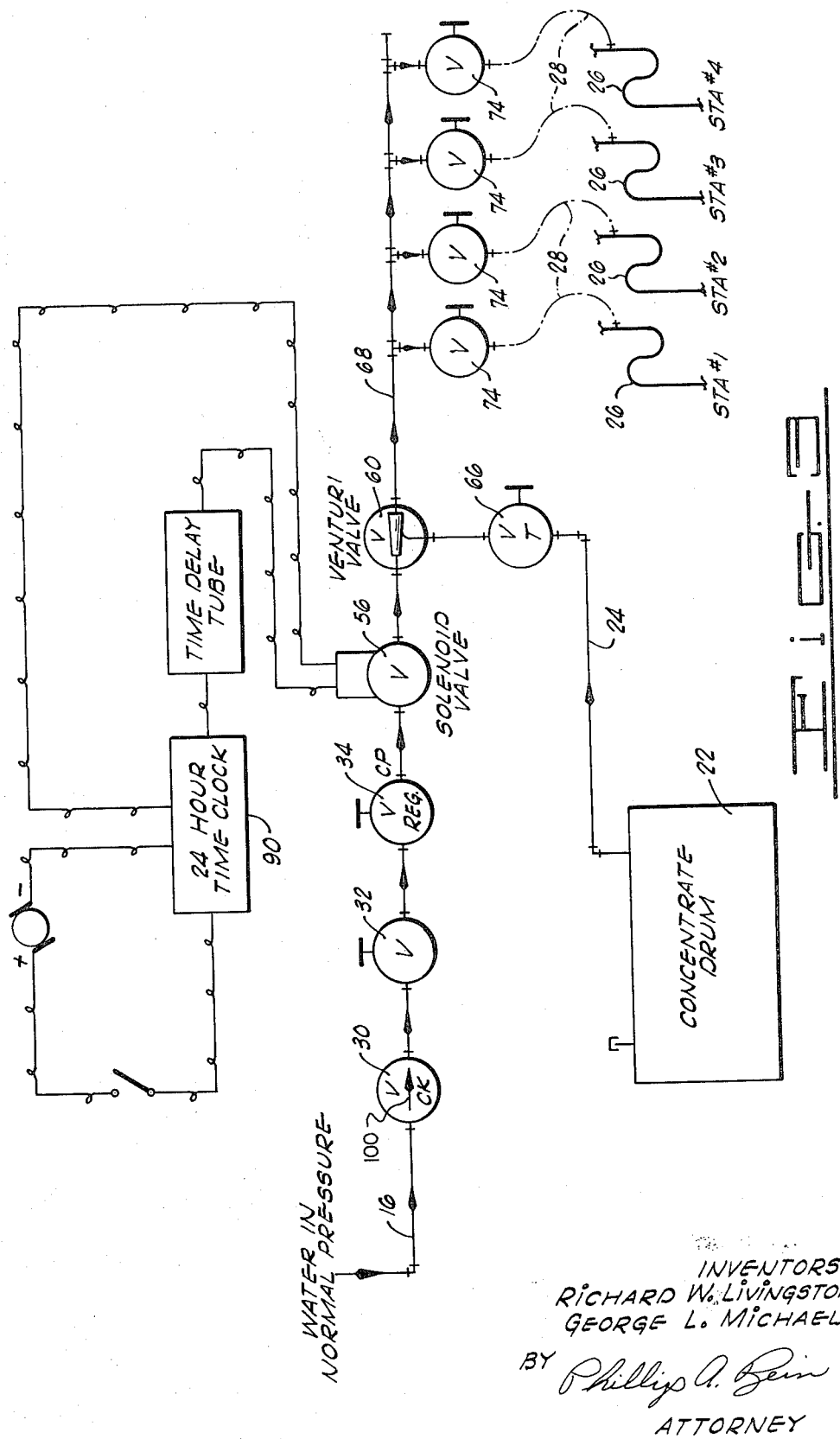
FIG. 3 is a schematic diagram illustrating the use and operation of the chemical feeder apparatus of this invention.

In the use and operation of the chemical feeder apparatus 10 of this invention as shown schematically in FIG. 3, the control means 20 may be mounted on the wall surface 12 in a desired location and the conductor plug 84 is placed into the plug-in receptacle 14 to provide the necessary current for operation of the time clock mechanism 90. Next the fluid, such as water, is supplied through the supply pipe member 16 into the fluid inlet assembly 40. Also, the hose member 24 of the concentrate inlet assembly 42 is placed within the concentrate supply drum 22 so as to be below the surface therein in order to pull the chemical therefrom. Next, the tube members 28 on the mixture discharge assembly 44 are connected to respective ones of the sewer trap assemblies 26, preferably as close to the point of fluid entrance as possible.

It is seen that the check valve 30 operates to assure fluid flow in the direction of an arrow 100 in FIG. 3 to prevent possible contamination of the water system. The gate valve member 32 is operable to control the opening therethrough so as to regulate the volume of fluid flow which is important for obtaining the precise resultant fluid mixture from the chemical feeder apparatus 10. The pressure regulator valve 34 may be used to provide a predetermined pressure, for example, if the water supply pressure is 75 psi, the water pressure supplied to the control means 20 may be regulated to 50 psi so as to have both regulated volume and pressure which is very important with the use of the venturi member 60.

Next, the adjustment valve 66 on the concentrate inlet assembly 42 is regulated so as to control the amount of concentrate to be moved therethrough under pressure differential created in the venturi member 60. It is obvious that the venturi member 60 is of a substantially conventional nature having a restricted throat area so as to create a reduction of pressure thereacross to achieve a suction through the adjustment valve member 66 and the hose member 24 which, in turn is connected to the concentrate supply drum 22. Finally, the mixture discharge assembly 44 is adjustable through the pressure control valves 74 individually so as to discharge a controlled amount of fluid mixture therefrom irregardless of the distance of the respective individual sewer trap assemblies 26 from the control means 20. These pressure control valves 74 are very important in the operation of the chemical feeder apparatus 10 to assure that the sewer trap assembly 26 nearest to the control means 20 does not receive an unnecessary large amount of the fluid chemical mixture due to its lower flow resistance.

It is seen that after proper adjustment of the variously described valve structures, the switch member 88 is placed in the "ON" position and the time clock mechanism 90 may be pre-set through the plurality of pin members so as to open the solenoid valve member 56 at predetermined intervals, perhaps, even three to four times per day if required to maintain the sewer trap assemblies 26 in the cleansed condition. It is obvious that various types of time delay relay tubes 92 may be used depending on whether it is desirable to have a fluid mixture discharge into the sewer trap assemblies 26 for 5, 10, 15, etc. second durations. It is obvious that the time clock mechanism 90 operates through the time delay relay tube 92 at certain pre-set times to actuate the solenoid valve member 56. In this condition, it is obvious that inlet fluid such as water flows therethrough at a predetermined volume and pressure. This flow through the venturi member 60 operates to pull an adjusted amount of concentrate from the chemical supply drum 22 for thoroughly mixing the same with subsequent discharge through respective ones of the pressure control valves 74 and the hose members 24 into the sewer trap assemblies 26. It is seen that the operation of the chemical feeder apparatus 10 is precisely controlled and automatically operable to overcome the disadvantages of the prior art structures requiring mechanical, hand, and/or chemical operations.

It is seen that the chemical feeder apparatus of this invention is readily installed in any desired remote location requiring a minimum amount of space for the control means to be mounted upon a wall surface and having a concentrate drum thereunder. The control means only requires the connection of plastic tube members to remotely positioned sewer trap assemblies, therefore, assembly difficulties are at a minimum. The chemical feeder apparatus is automatically operable to provide for the chemical mixture discharge for cleansing pipe members or other such structures requiring chemical cleaning. It is obvious that the chemical feeder apparatus of this invention could also be utilized to discharge deodorants into toilet facilitates or other such type of uses.

While this invention has been described in conjunction with preferred specific embodiments thereof, it will be understood that this description is intended to illustrate and not to limit the scope of the invention, which is defined by the following claims.

We claim:

1. A chemical feeder apparatus connectable to an electrical supply and a fluid supply operable to automatically dispense a fluid mixture into one or more remote areas, comprising:
   a. a fluid supply assembly connected to said fluid supply,
   b. a control means having a fluid inlet assembly connected to said fluid supply assembly to receive fluid therefrom; a concentrate fluid inlet assembly connected to said fluid inlet assembly; a mixture discharge assembly connected to said concentrate fluid inlet assembly to discharge said fluid mixture to the remote areas: and an actuator assembly connected to said fluid inlet assembly to selectively permit and prevent flow of said fluid supply through said control means,
   c. said fluid supply assembly having means for regulating the fluid volume and pressure to said concentrate fluid inlet assembly to mix concentrate with said fluid supply under fluid pressure differential, and
   d. said remote areas each having a sewer trap assembly connected to said mixture discharge assembly to receive said fluid mixture downstream of the source of sewer materials, and each of said sewer trap assemblies operable to convey sewer materials therethrough in a conventional manner regardless of the status of said chemical feeder apparatus.

2. A chemical feeder apparatus as described in claim 1, wherein:
   a. said regulating means including, successively connected to said fluid supply, a check valve to regulate direction of fluid flow; and a pressure regulating valve to control pressure of fluid flow thereby assuring said fluid supply into said control means of a predetermined constant volume and pressure,
   b. said fluid inlet assembly having a solenoid valve member mounted in a pipe member connected to said fluid supply movable between opened and closed conditions,
   c. said solenoid valve member connected to a timer mechanism of said actuator assembly to open and close same at predetermined intervals, and
   d. said actuator assembly including a time delay relay tube mounted between said timer mechanism and said solenoid valve member operable when energized by said timer mechanism to hold said solenoid valve member open for a predetermined time period.

3. A chemical feeder apparatus as described in claim 1, wherein:
   a. said regulating means including, successively connected to said fluid supply, a check valve member to assure flow in only one direction; a gate valve to regulate volume of flow; and a pressure regulating valve to control pressure of fluid flow thereby assuring said fluid supply into said control means of a predetermined steady volume and pressure,
   b. said concentrate fluid inlet assembly including a venturi member mounted between said fluid supply and said mixture discharge assembly and having a portion thereof connected through a hose member to a concentrate drum whereby said venturi member operates to create a suction in said hose member to pull concentrate into said fluid supply,
   c. said fluid inlet assembly having a solenoid valve member mounted in a pipe member connected to said fluid supply assembly movable between opened and closed conditions,
   d. said solenoid valve member connected to a timer mechanism of said actuator assembly to open and close same at predetermined intervals, and
   e. said actuator assembly including a time delay relay tube mounted between said timer mechanism and said solenoid valve member operable when energized by said timer mechanism to hold said solenoid valve member open for a predetermined time period,
   f. said mixture discharge assembly having a plurality of adjustable valve members each connected on an inlet side to the output of said concentrate fluid inlet assembly and on an outlet side to a tube member, respectively, and
   g. said valve members adjusted relative to the distance of said remote areas therefrom to assure an equal amount of fluid mixture conveyed thereto.

* * * * *